United States Patent [19]

Melen

[11] Patent Number: 5,487,118
[45] Date of Patent: Jan. 23, 1996

[54] SEQUENTIAL EXTRACTION OF STROKES FROM A STROKE BASED SYMBOL APPARATUS AND METHOD

[75] Inventor: Roger D. Melen, Los Altos Hills, Calif.

[73] Assignee: Canon Inc., Tokyo, Japan

[21] Appl. No.: 224,786

[22] Filed: Apr. 8, 1994

Related U.S. Application Data

[63] Continuation of Ser. No. 787,615, Nov. 4, 1991, abandoned.

[51] Int. Cl.$^6$ ............................................. G06K 9/46
[52] U.S. Cl. ............................................. 382/202
[58] Field of Search ............................... 382/173, 181, 382/187, 199, 202, 209, 218, 282

[56] References Cited

U.S. PATENT DOCUMENTS

4,642,813  2/1987  Wilder ........................................ 382/22
5,164,996  11/1992  Pastor ......................................... 382/25

*Primary Examiner*—Jose L. Couso
*Attorney, Agent, or Firm*—Paul Hentzel; Edward J. Radlo

[57] ABSTRACT

Stroke-based symbols such as conventional alpha-numerics are formed by individual strokes. Each stroke has intersections or node regions common to two or more strokes and main inter-node body regions unique to a single stroke. Strokes are a primary recognition cue to the human eye and for OCR techniques. The length and orientation of each stroke is determined and entered into a library of extracted strokes for analysis and matching. After selection each stroke is physically cut from the stroke based symbol to assist in selecting the next stroke. The body regions are cut first. The common node regions are temporarily protected to preserve the end nodes of the remaining strokes. Each node is cut during the extraction sequence of the last stroke common to that node. This sequential removal of strokes results in a progressively diminishing symbol residue and a progressively increasing library of extracted strokes.

19 Claims, 6 Drawing Sheets

SEQUENTIAL EXTRACTION OF STROKES FROM A STROKE BASED SYMBOL APPARATUS AND METHOD

This application is a continuation of application Ser. No. 07/787,615, filed Nov. 4, 1991, now abandoned.

TECHNICAL FIELD

This invention relates to stroke based OCR, and more particularly to the sequential extraction of strokes within a stroke based symbol.

BACKGROUND

Heretofore stroke analysis has been employed in OCR using mask alignment technics for isolating individual strokes within a stroke based symbol. The stroke set isolated from each symbol was then matched to a library of reference stroke sets for identification. However the isolated strokes were not physically removed from the symbol image to facilitate the isolation of the remaining strokes.

SUMMARY

It is therefore an object of this invention to provide a method and apparatus for removing strokes from a stroke based symbol.

It is another object of this invention to provide such a method and apparatus in which the node regions of the remaining strokes are protected.

It is a further object of this invention to provide such a method and apparatus for sequentially removing strokes from set of strokes forming a stroke based symbol.

It is a further object of this invention to provide such a method and apparatus employing node detection boundaries.

It is a further object of this invention to provide such a method and apparatus employing a cutting matrix defined by the node regions.

It is a further object of this invention to provide such a method and apparatus in which the symbol is rotated to facilitate deleting the stroke to be extracted.

Briefly, these and other objects of the present invention are accomplished by providing a method and apparatus for sequentially extracting strokes from a pixel bit map of a stroke based symbol. As each stroke is extracted, the stroke based symbol forms a progressively diminishing symbol residue and a progressively increasing number of strokes are entered into a library of extracted strokes. A pixel bit map provides the stroke based symbol for extraction of the strokes. The current stroke to be extracted is selected from the stroke based symbol. The current stroke is cut from the stroke based symbol by deleting pixels forming the current stroke. The current stroke is entered into a library of extracted strokes. The selecting cutting and entering stroke extraction steps are repeated for sequentially extracting the remaining strokes within the symbol residue.

BRIEF DESCRIPTION OF THE DRAWING

Further objects and advantages of the stroke extraction technique and the method and operation the node protection feature will become apparent from the following detailed description and drawing in which:

FIG. 1 A–E is a sequence of diagrams of an "A" symbol progressing through the extraction sequence showing the progressively diminishing residue of the symbol;

The first digit of each reference numeral in the above Figures indicates the Figure in which that element is shown. The second digit indicates like structural elements, and the final letter indicates a sub-portion of an element.

GENERAL STROKE EXTRACTION (FIG. 1)

Stroke-based symbols such as conventional alpha-numerics are formed by individual strokes. Each stroke has intersections or node regions common to two or more strokes and main inter-node body regions unique to a single stroke. Strokes are a primary recognition cue to the human eye and for OCR techniques. The length and orientation of each stroke is determined and entered into a library of extracted strokes for analysis and matching. After selection each stroke is physically cut from the stroke based symbol to assist in selecting the next stroke. The body regions are cut first. The common node regions are temporarily protected to preserve the end nodes of the remaining strokes. Each node is cut during the extraction sequence of the last stroke common to that node. This sequential removal of strokes results in a progressively diminishing symbol residue and a progressively increasing library of extracted strokes.

The "A" symbol in the embodiment of FIG. 1, has three strokes (left leg stroke 11, right leg stroke 12 and horizontal bridge stroke 13); and five common nodes (top node 11t joining the left and right stroke, middle nodes 11M and 12M joining the bridge stroke to the left and right strokes, and bottom nodes 11B and 12B joining the foot serifs 11F and 12F to the left and right stroke). Three extraction sequences are required to extract the three strokes from the "A" symbol.

Figure 1A:
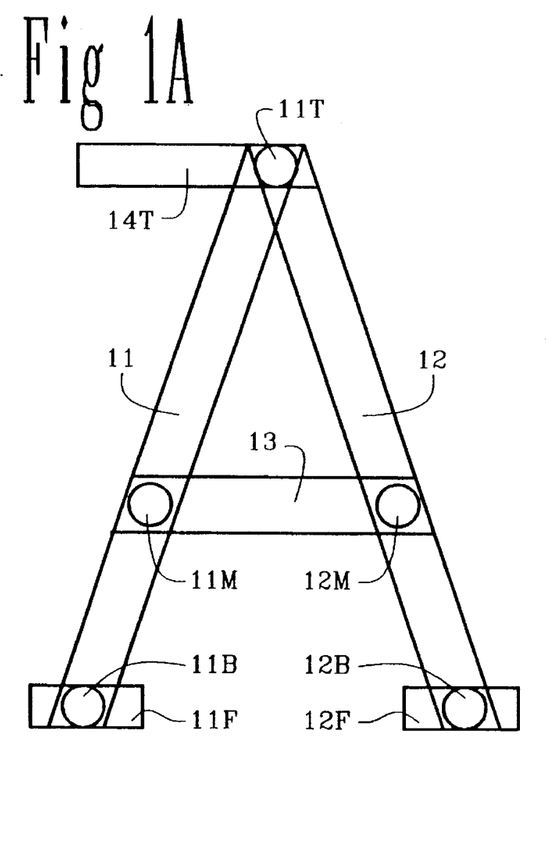
Figure 1B:
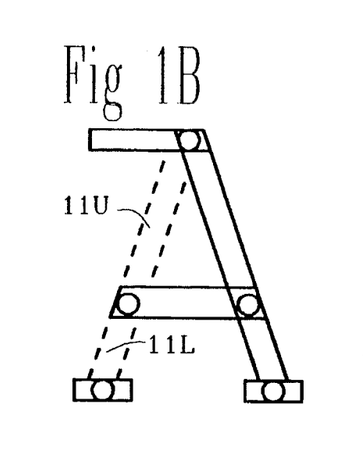

During the first sequence, upper body region 11U and lower body region 11L are extracted from left stroke 11 (see dashed lines FIG. 1B). The three nodes in the left stroke are protected in order to preserve bridging stroke 13, top serif 14T, and left foot serif 11F.

Figure 1C:
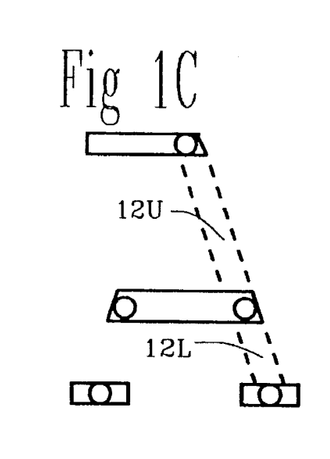
Figure 1D:
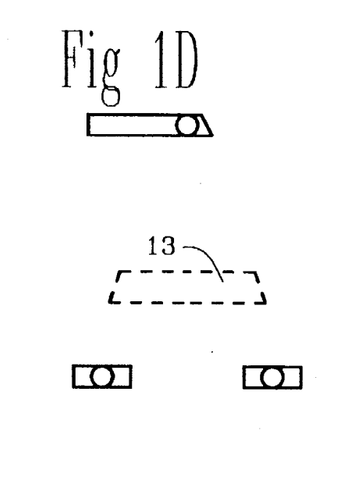
Figure 1E:
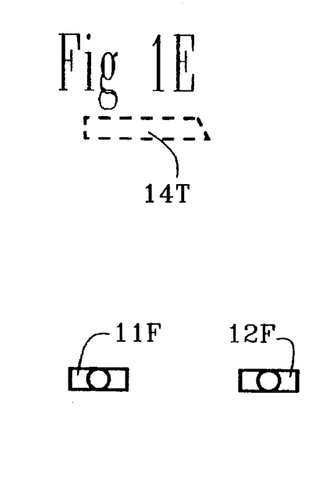

During the second sequence, upper and lower body regions 12U and 12L of the right stroke 12 are extracted (see dashed lines FIG. 1C). Again, all of the nodes are preserved. During the final extraction sequence, horizontal bridge stroke 13 is cut along with the two middle nodes 11M and 12M at the ends of the bridge stroke (see dashed lines FIG. 1D).

The shorter minor strokes in alpha-numeric symbols tend to be about one third the length of the longer major strokes. In general therefore, there is a "threshold of meaning" for each font somewhere below the one third level which defines the minimum stroke length. Pixel structures less then this predetermined minimum stroke length (MSL) are considered as having minimal cognitive value for identifying the symbol. These sub-MSL structures are not extracted or entered into the library.

In the "A" symbol example of FIG. 1, top serif 14T is greater than the MSL and is extracted (see dashed lines FIG. 1E) along with top node 11T. However, foot serifs 11F and 12F are less than the MSL and form the terminal residue (see solid lines FIG. 1E) of the symbol.

Figure 2:
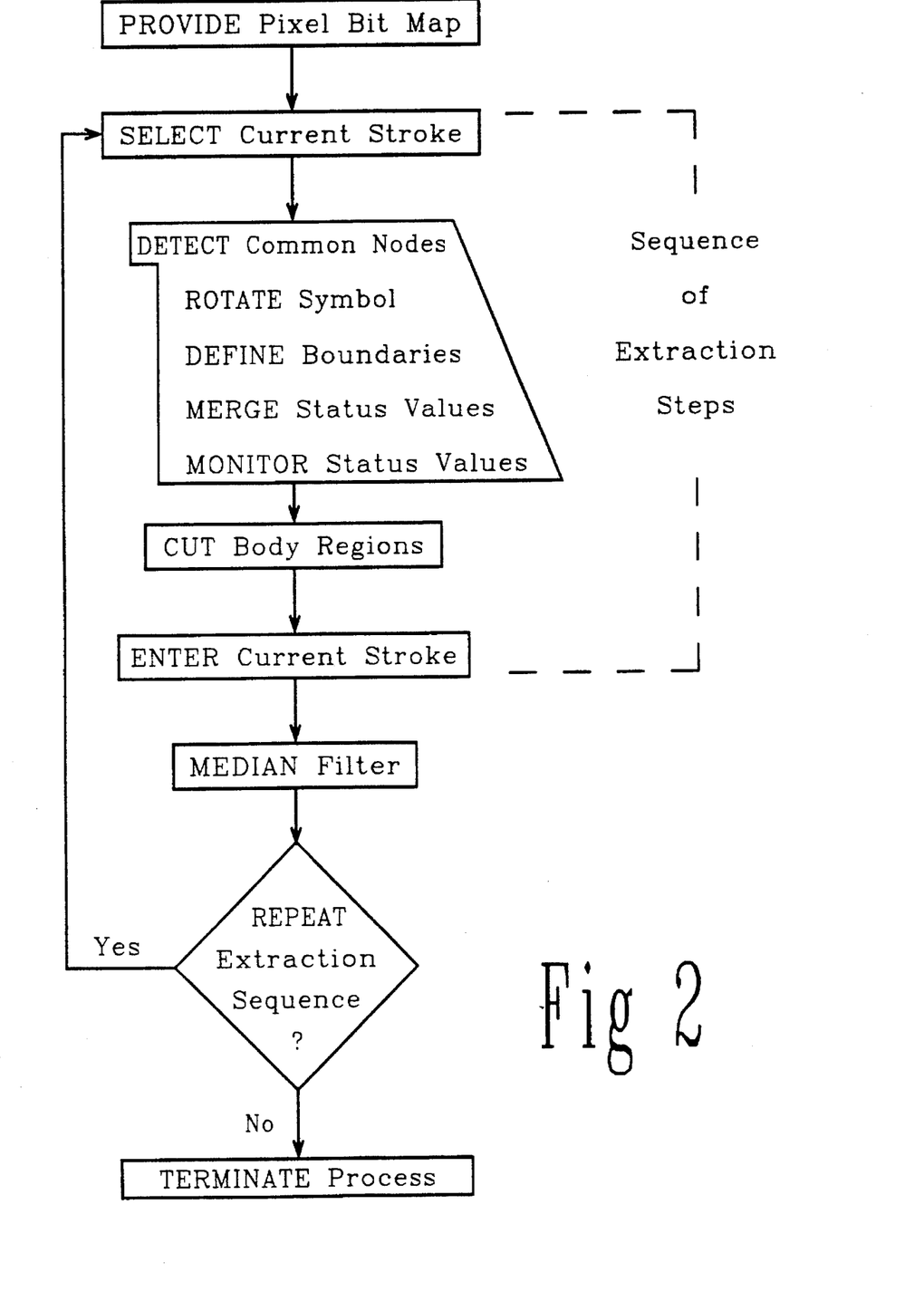
FIG. 2 is a flow chart showing the sequence of stroke extraction steps.

METHOD CUTTING—FLOW CHART (FIG. 2)

The stroke based symbol is presented in a pixel bit map memory in which each individual stroke is represented by a group of contiguous pixels. The current stroke to be extracted is selected. This identification is preferably based on a systematic survey of the symbol image such as longest remaining stroke or radial sweep.

The longest remaining stroke may be determined by Hough transform techniques which seek the greatest number of pixels extending in a straight line. Long strokes have greater cognitive value for identifying symbols. Further, long strokes are the easiest to locate and have less digital noise due to their greater pixel mass.

Radial sweeps involve a series of successive small angular rotations of between 3 to 6 degrees over a large sweep angle of 180 degrees. Curved strokes may be treated as a series of short strokes, or processed by other techniques.

Figure 3A:
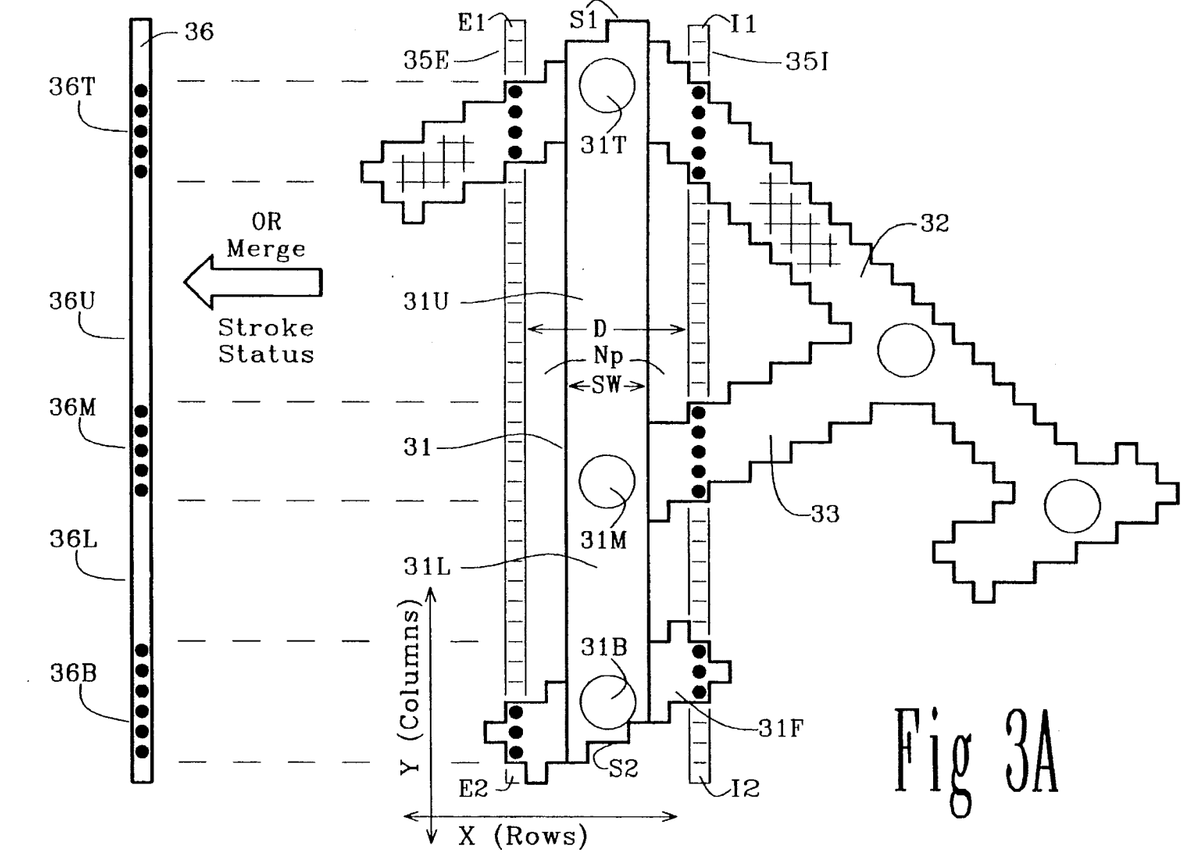
FIG. 3A is a diagram of a rotated "A" symbol showing the status of the boundary pixels in the detection boundaries and the composite table of entries produced by an OR merge.

Common nodes present in the current stroke are detected and protected using boundary lines constructed on either side of the current stroke (see FIG. 3A). The contiguous pixels forming the inter-node body regions are cut from the current stroke using a cutting matrix (see FIG. 3B). The contiguous pixels forming the node regions are cut last in order to preserve the integrity of the remaining strokes.

In addition to being cut, the current stroke is entered into a library of extracted strokes. This stroke set is eventually matched with the stroke sets of reference symbols stored in a reference library (see FIG. 5). The input stroke set and reference stroke sets contained in the libraries may have any suitable data format sufficient to geometrically define the strokes such as stroke angle "SA", stroke length "L", and the XY coordinates "S1" of one end. If desired, the stroke data format may be the stroke angle "SA" and the coordinates of both ends "S1" and "S2".

The stroke extraction steps of selecting, cutting and entering are repeated until all of the major strokes have been extracted. The stroke extraction process may be terminated when the pixel structures remaining in the symbol residue are smaller than the predetermined minimum stroke length (MSL) defining the threshold of meaning. One criteria for terminating the extraction process is:

MSL= 2SW where

MSL is a predetermined minimum stroke length, and

SW is the overall stroke width of all of the strokes forming the stroke based symbol.

All pixel structures such as serifs shorter the MSL have minimal recognition content and are be excluded from the extraction process.

Individual non-standard strokes may be removed from an alpha-numeric stroke set prior to the extraction sequence in order to enhance the image for recognition. Pixels forming underline strokes have little cognitive value and may be deleted by an early cutting sequence before the initial current stroke is selected. Various hand entered annotations and other noise marks may also be eliminated. In the image enhancement sequence, the non-standard pixel structures are identified and cut without entering the stroke data into the reference library.

DETECTING COMMON NODES—(FIG. 3A)

The location of the stroke nodes in the current stroke being extracted must be determined in order to protect the node regions during the cutting of the inter-node body regions. The node detection is based on the stroke status and background status of the pixels adjacent to the current stroke. The pixels in the bit map forming the node regions and the body regions within the symbol are stroke pixels having stroke status. These stroke pixels are the inked or pigmented portions of the symbol in a conventional positive printed image and are traditionally assigned the number "1" in a binary black and white system. The remaining pixels forming the non-stroke area around and between strokes are background pixels having background status. The background pixels form the white background in a conventional image and are traditionally assigned the number "0" in a binary system.

If preferred, the stroke based symbol may be rotated relative to the XY coordinate axis of the bit map prior to node detection. The symbol rotation simplifies the bit map geometry by aligning the current stroke with either the horizontal coordinate axis (X axis) or the vertical coordinate axis (Y axis). In the embodiment of the "A" symbol of FIG. 3, left leg stroke 31 is aligned with the vertical axis. Aligned strokes are more conveniently defined and processed mathematically and have minimum "stair casing". Any suitable rotation technique may be employed such as linear interpolation based rotation.

Node detection boundaries are defined on either side of the current stroke such as external boundary line 35E and internal boundary line 35I. The symbol rotation reduces the boundary lines to simple rows or columns of pixels. Thus the pair of boundary lines of aligned strokes are always parallel to one coordinate and normal to the other. The boundary lines are parallel to each other and displaced apart by a pixel distance "D". The boundary lines extend generally parallel to the current stroke. The distance "D" is edge exclusive and does not include the edge boundary pixels in the boundary lines. The distance "D" may be determined from the relationship:

D= SW+ 2Np where

SW is the overall stroke width of all of the strokes forming the stroke based symbol, and Np is a predetermined number of margin pixels in the margin band between the boundary line and the current stroke.

Preferably, the boundary lines are uniformly displaced from the current stroke with Np pixels on each side.

In the embodiment of FIG. 3, current stroke 31 has been rotated to the vertical (stroke angle "SA"= 0); and the pair of boundary lines are represented by a single column of vertical pixels. The pixel distance "D" between the boundary lines is 8 pixels (SW= 4 and Np= 2). The top and bottom end pixels "E1" and "E2" of the external boundary line 35E have the same Y coordinate as the top and bottom pixels "S1" and "S2" ends of the center line of the current stroke, but are displaced by X= −(SW/2+ Np)=−4 pixels to the left of the center line. The end pixels "I1" and "I2" of the internal boundary line 35I also have the same Y coordinate but are displaced by X= +(SW/2+ Np)= +4 pixels to the right of the center line. The status value of each pixel in the boundary lines is indicated by the color of the pixel (stroke= 1 = dark spot, background= 0= white).

MERGING THE STATUS VALUES (FIG. 3A)

The status values of the boundary line pixels are monitored to detect node regions (if any) in the current stroke. If desired, the status values of the pixels in the pair of boundary lines may be merged after defining the detection boundaries but prior to the monitoring. A status value of "1" (dark spot) reveals that the two margin pixels between that boundary line pixel and the current stroke are stroke pixels contained in a stroke extending from an adjacent node region in the current stroke. A boundary pixel with a status value of "0" (white) reveals that the two margin pixels are background pixels and the adjacent region in the current stroke is a body region.

The three groups of dark spot pixels appearing in interior boundary line 35I reveal three common nodes in left leg stroke 31 (top node 31T joining the two legs, middle node 31M joining bridge stroke 33 with the left leg, and bottom node 31B joining foot 31F with the left leg. The single group of dark spot pixels near the bottom of exterior boundary line 35E reveal" the bottom foot node. The white pixels in both boundary lines reveal upper body region 31U and lower body region 31L in the left leg which are to be cut (see dashed lines FIG. 3B).

The status value of each boundary pixel in the series of boundary pixels forming one of the straight boundary lines may be merged with the corresponding boundary pixel in the series of boundary pixels forming the other straight boundary line. The result of the merge is a single series of composite status values revealing the presence and location of common nodes within the current stroke. Each composite entry is based on the merge of the two corresponding boundary line pixels.

In an OR type merge of stroke status, the resulting composite entry has stroke status (dark spot) if either one or both of the two merged pixels has stroke status as shown by the dark spots in column table 36 of composite entries. In a NAND type merge of background status, the resulting composite entry has background status (white) only if both of the two merged pixels have background status. Both the OR and NAND merges are biased toward over-defining the nodes and undercutting the body regions in order to preserve pixels in and around the node regions. The undercutting minimizes the number of pixels deleted during each cutting step.

The three groups of dark stroke entries in composite entry table 36 are caused by the three common nodes in the left leg. The top dark entry 36T corresponds to top node 31T; the middle dark entry 36M corresponds to middle node 31M; and the bottom dark entry 36B corresponds to bottom node 31B. The two groups of white background entries 36U and 36L correspond to the upper body region 31U and lower body region 31L in the left leg.

Figure 3B:
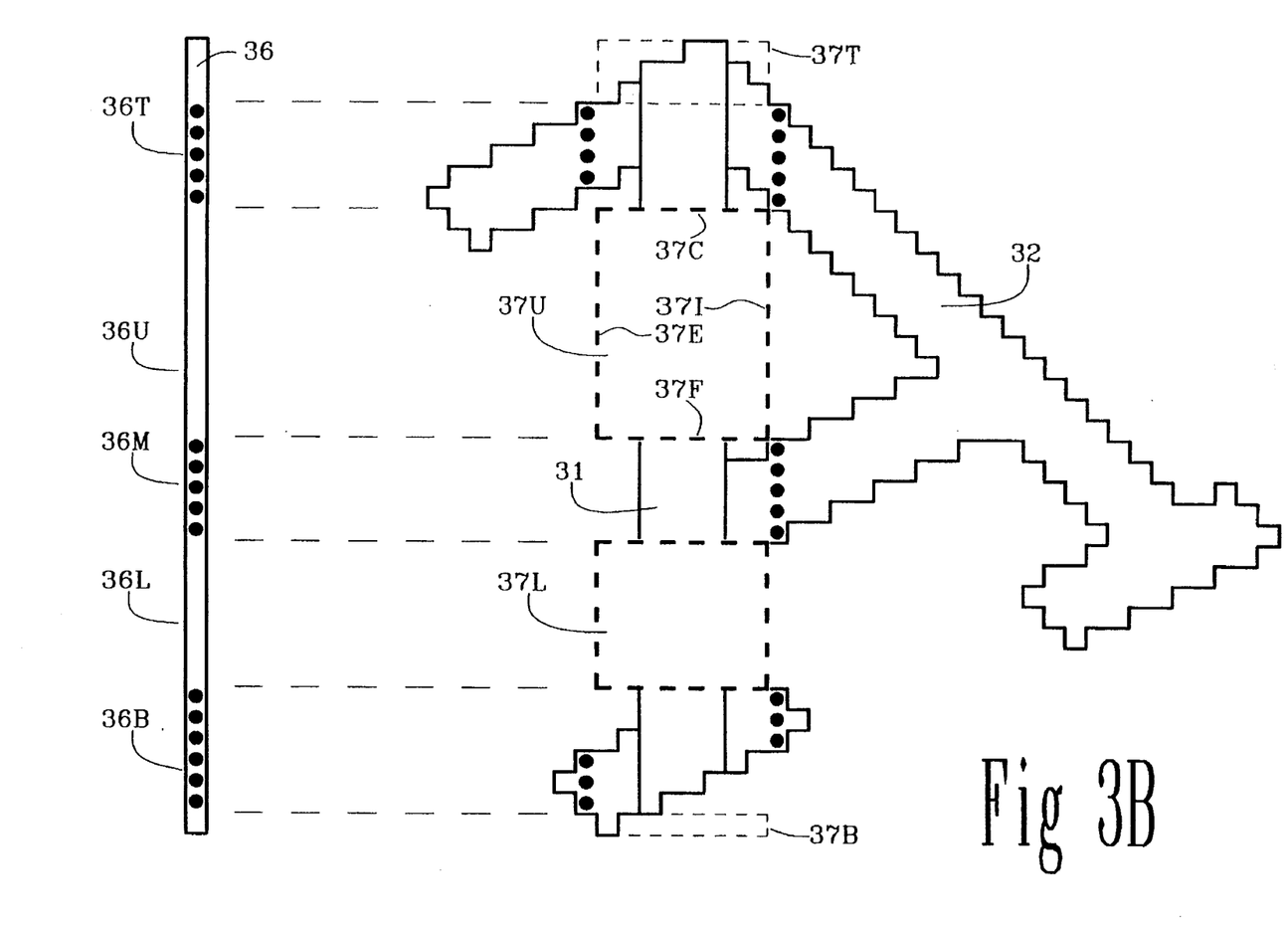
FIG. 3B is a diagram of the rotated "A" symbol of FIG. 3A showing the cutting matrices defined by the composite entries.

CUTTING THE BODY REGIONS (FIG. 3B)

The actual deletion of the body regions from the current stroke is effected through cutting matrices defined by the background entries in the composite entry table. Cutting matrix 37U deletes body region 31U (see FIG. 3B), and cutting matrix 37L deletes body region 31L. In the rotated embodiment of FIG. 3, each body cutting matrix is a rectangle having vertical side edges 37E and 37I and horizontal floor and ceiling edges 37F and 37C. The vertical side edges are formed by the column of pixels next to the segments of the vertical boundary lines corresponding to the segment of white background entries 36U and 36L in the composite table. The first and last entries in each background segment define a vertex of the rectangular cutting matrix. The horizontal floor edge 37F and ceiling edge 37C of each cutting matrix is formed by horizontal lines extending between the corresponding corner pixels in the side edges. During the cutting step, every pixel within the cutting matrix is deleted; that is, all of the stroke pixels (1) within the four cutting edges are converted to background pixels (0).

Pseudo cutting matrices may develop at end nodes formed by strokes which do not join at right angles. In the "A" symbol of FIG. 3, top pseudo matrix 37T is created by the acute angle intersection between the current stroke leg 31 and right leg 32. The top pseudo matrix is three pixels high. Bottom pseudo matrix 37B is one pixel high. Pseudo matrices may be eliminated by end node protection provisions such as preserving the exposed ends of end nodes which extend less than one stroke width.

MEDIAN FILTERING

The diminishing symbol residue may be median filtered after each cutting step to eliminate cutting debris and isolated stroke fragments. The greyscale of each pixel is adjusted to the median greyscale of the population of pixels within a specified two dimensional area around the pixel. The size (MF) of the median filter may be MF= SW–1 Pixel where SW is the overall stroke width of all of the strokes forming the stroke based symbol.

The size of the median filter for a four pixel SW is

M= 3 Pixels by 3 Pixel.

Figure 4:
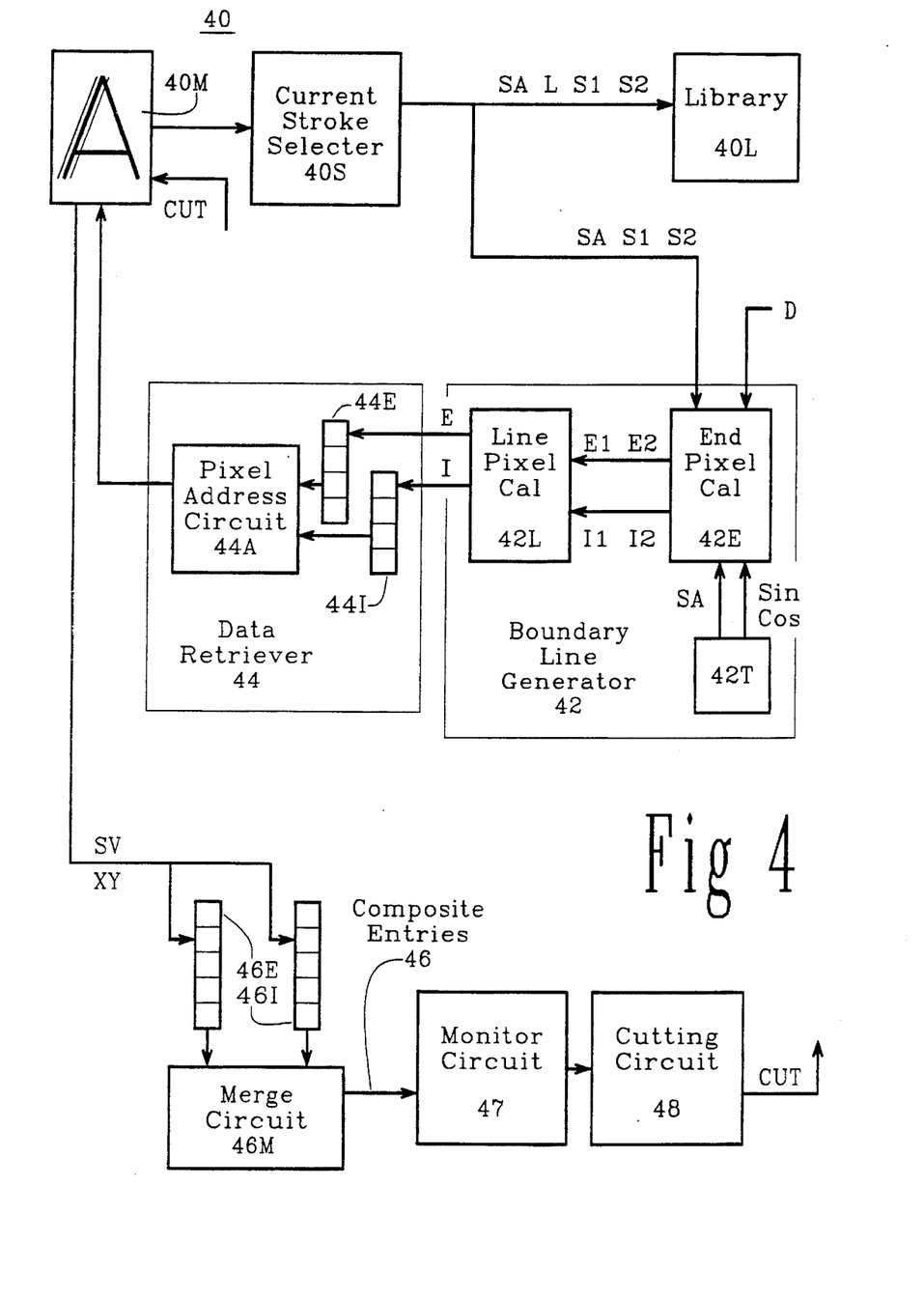
FIG. 4 is a block diagram of general apparatus for stroke extraction.

GENERAL APPARATUS (FIG. 4)

Apparatus 40 for detecting the node regions and for cutting the inter-node body regions is shown in FIG. 4. Pixel bit map 40M stores the set of strokes forming the stroke based symbol for the extraction sequence ("A" symbol in FIG. 4). The pixels in the "A" symbol map are either stroke pixels having a stroke status or background pixels having a background status. Current stroke selector 40S surveys the "A" symbol and selects the longest remaining stroke which becomes the current stroke. The current stroke data:

Stroke Angle "SA",

Length "L", and

Stroke end pixel coordinates "S1" and "S2" is entered into library 40L for matching analysis.

Boundary line generator 42 receives "SA", "S1", and "S2" in order to generate node detection lines 45E and 45I. Data retriever 44 is responsive to the boundary lines from boundary generator 42 for addressing the pixel bit map to access each boundary pixel location and retrieve the status value "SV" thereof. Merge circuit 46M receives the status values of the boundary lines and merges them into a set of single composite status entries. Monitor Circuit 47 examines the composite entries to determine the presence and location of nodes within the current stroke which defines the dimensions of the cutting matrices (or matrix). Cutting circuit 48 is responsive to the monitor circuit for deleting the stroke pixels within the cutting matrices (or matrix) which form the body regions (or region) in the current stroke. The cutting circuit also preserves the node pixels forming the common node regions in the current stroke.

BOUNDARY LINE GENERATOR (FIG. 4)

The coordinate system of the pixel bit map has a primary coordinate axis such as vertical axis Y (or horizontal axis X) and a secondary coordinate axis such as horizontal axis X (or vertical axis Y). The current stroke extends at a CW angle "SA" with respect to the primary coordinate axis and at 90 degrees minus angle "SA" with respect to the secondary coordinate axis. In the embodiment of FIG. 4, the "A" symbol is not rotated into alignment with either coordinate axis and "SA" therefore has a non-zero value.

The detection boundaries lines are separated by the pixel distance "D" and extend parallel the current stroke with one line each side of the current stroke. The end pixels of boundary line 45E ("E1" and "E2") are offset from the stroke end pixels "S1" and "S2" of the current stroke by the distance (D/2)sin(SA) along the primary coordinate axis and by the distance (D/2)cos(SA) along secondary coordinate axis. Likewise, the end pixels of boundary line 45I ("I1" and "I2") are offset from the stroke end pixels by the distances −(D/2)sin(SA) and −(D/2)cos(SA). That is the coordinates of end pixels of "E1" and "I1" are:

E1y=S1y+(D/2)sin(SA)

E1x=S1x+(D/2)cos(SA)

I1y=S1y−(D/2)sin(SA)

and

I1x=S1x−(D/2)cos(SA).

The coordinates of the end pixels "E2" and "I2" are similarly defined in terms of the coordinates of "S2".

End pixel calculator 42E determines the XY offset coordinates of the four boundary line end pixels "E1", "E2", "I1" and "I2" based on the current stroke angle "SA" and the XY coordinates of the current stroke end pixels "S1" and "S2". The desired value of distance "D" is provided and the required sine and cosine values are retrieved from function table 42T. Once the end pixel coordinates are determined, line pixel calculator 42L calculates the XY coordinates of every line pixel on the straight boundary line between the end pixels using a suitable interpolation technic such as Bresenham's algorithm incremental for scan conversion of a line. Other Bresenham algorithms relate to conversion of non-linear strokes such as ellipses, circles and other curves. Further information concerning Bresenham's algorithms are disclosed in the text book "Computer Graphics Principles and Practice" 2nd Edition (particularly Section 3.2.2 Midpoint Line Algorithm) by authors James D. Foley, Andries van Dam, Steven K. Feiner, and John F. Hughes from Addison-Wesley publishing company; which disclosure is incorporated by reference herein in its entirety.

In the rotated embodiment of FIG. 3, each boundary line is formed by a vertical column of contiguous pixels. Columns 35E and 35I are one pixel wide. However, contiguous pixels are not required. Boundary pixels may be systematically skipped in order to speed up the boundary line generation, data retrieval, merge, and cutting steps. For example, every other pixel may be employed with equal effectiveness. If every third pixel is monitored, then two pixel sections of spacing pixels therebetween are not monitored. Preferably, the non-contiguous spacing between the employed pixels is less than the stroke width of the symbol font. If the section of spacing pixels is greater than the stroke width, some of the nodes in the current stroke may not be detected. A pixel spacing of one half of the stroke width provides an increase in speed without the danger of undetected nodes.

In the non-rotated embodiment of FIG. 4, the boundary lines are not necessarily aligned with either axis, and the resulting boundary lines are generally formed by an oblique series of pixels. Thin strokes of stroke width "SW"= 1 may diagonally cross the oblique boundary line at a narrow "pinch" point between adjacent pixels. Such a thin stroke would not produce the stroke status pixels in the boundary line, causing a node between the thin stroke and the current stroke to go undetected. Double thick boundary lines may be employed to prevent this loss of thin stroke nodes.

RETRIEVING AND MERGING

Address storage registers 44E and 44I in data retrieval circuit 44 receive the address of the end pixels and each line pixel of the boundary lines as they are calculated by the line pixel calculator. Pixel address circuit 44A sequentially accesses the bit map at the boundary pixel addresses to retrieve the status value of each boundary pixel. Stroke pixels have stroke status and form the black area of the current stroke. Background pixels have background status and, form the white area between the strokes. Status storage registers 46E and 46I receive each status value "SV" (and accompanying XY coordinate) for merge circuit 46M which ORs the status value of each pixel forming boundary line "E" with the status value of the corresponding pixel forming boundary line "I", producing a series of composite entries 46. The background segments in the composite entries reveal body regions in the current stroke. The first and last entries in each segment define the vertices of the cutting matrix. Each composite entry therefore includes the XY coordinates of the two underlying boundary pixels in order to construct the cutting matrix from the vertices.

Figure 5:
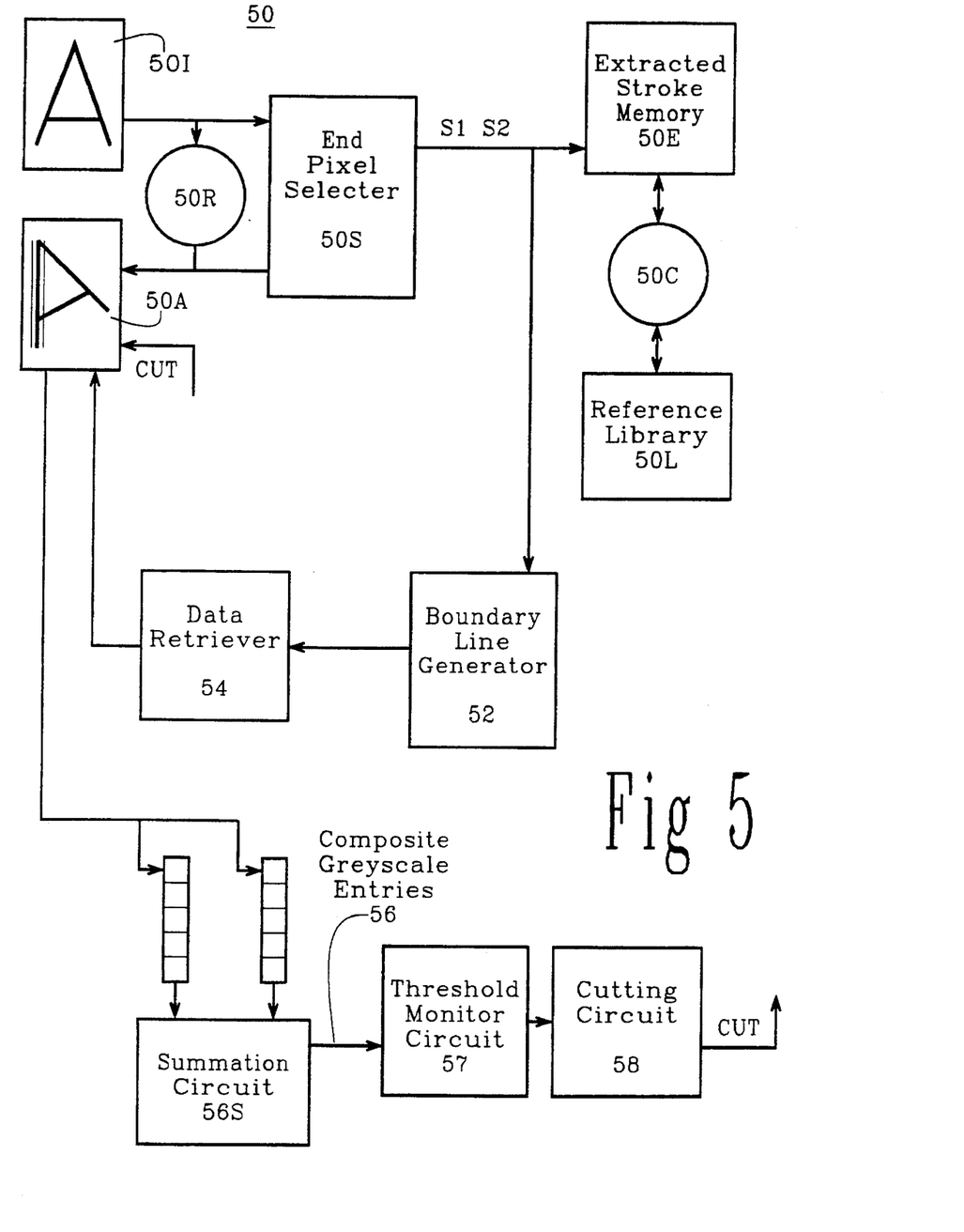
FIG. 5 is a block diagram of apparatus for extracting a rotated stroke from a greyscale image with SUM merging.

GREYSCALE SUMMATION APPARATUS
(FIG. 5)

A more exact stroke set may be extracted from a greyscale image of the stroke based symbol using greyscale apparatus 50 (see FIG. 5). The greyscale data permits a more accurate digitation of the stroke angle and end pixel coordinates.

End pixel selector 50S surveys initial bit map 50I and selects the end pixels "S1" and "S2" of the current stroke. Symbol rotating circuit 50R aligns the current stroke with the vertical axis and advances the rotated symbol to aligned bit map 50A. The end pixels "S1" and "S2" are stored in extracted stroke memory 50E for matching with reference symbols from reference library 50L through matching computer 50C. The stroke angle (and stroke length) may be calculated from the end pixel coordinates as required. The current stroke end pixels are advanced to boundary line generator 52 for calculating the pixels forming the two column boundary lines for the current aligned stroke. Data retriever 54 addresses the aligned bit map for retrieving the greyscale values of the boundary line pixels.

Summation circuit 56S adds the greyscale value of each pixel in one boundary line pixel to the greyscale value of the corresponding pixel in the other boundary line producing a series of composite greyscale entries 56. Threshold monitor circuit 57 determines whether each composite greyscale entry is greater then (or less then) a threshold greyscale and should have stroke status (or background status). The stroke status entries are monitored to define the dimensions of the cutting matrix for cutting circuit 58.

FIXED NODE FORMATS

In conventional alpha-numeric fonts the nodes and body regions tend to have fixed locations. The most common node sites in vertical strokes are the upper end, near the middle, and lower end. In horizontal strokes the nodes usually appear at the leading and tailing ends. Node free body regions are common along the upper half and lower half of vertical strokes and along the middle of horizontal strokes.

The stylized font popular in computer displays has six node regions and seven node free body regions. The six nodes are symmetrically arranged in pairs (two top nodes, two middle nodes and two bottom nodes). The seven body regions have the same body length "BL" and stroke width "SW". The vertical strokes in these stylized fonts, have the node free regions centered at about 0.25 of the stroke length "SL" and about 0.75 of the "SL" down from the top node of the stroke. The top, middle, and bottom of the vertical strokes have node protection zones one "SW" wide. The height of the protection zones for each node may be dependent on the "SW" (1.5 SW for example).

The cutting matrix may be wider than "SW" (2 SW for example) to insure that the stroke is completely deleted from the bit map during extraction. The length of the cutting matrix is dependent on the body length "BL" and "SW" of the font. The longest cutting matrix may be 0.3 BL to 1.0 BL for example; and the shortest cutting matrix may be 1 SW. Lines shorter than 1 SW are not considered major strokes, and are not extracted by the fixed node format approach.

CONCLUSION

It will be apparent to those skilled in the art that the objects of this invention have been achieved. Clearly various changes may be made in the structure and embodiments shown herein without departing from the concept of the invention. Further, features of the embodiments shown in the various Figures may be employed with the embodiments of the other Figures. Therefore, the scope of the invention is to be determined by the terminology of the following claims and the legal equivalents thereof.

I claim as my invention:

1. The computer-implemented method of extracting an individual stroke from a pixel bit map of a stroke based symbol, said method comprising the steps of:

providing, within a storage area of a computer, a pixel bit map of the stroke based symbol formed by stroke pixels having stroke status forming fixed node regions of contiguous node pixels common to a stroke and one or more other strokes within the stroke based symbol, and by stroke pixels having stroke status forming fixed body regions of contiguous body pixels unique to a stroke, and by background pixels having background status forming non-stroke areas between strokes;

selecting an individual stroke to be extracted from the stroke based symbol;

defining a pair of straight detection boundary lines each formed by a series of boundary pixels along each side of the individual stroke to be extracted, the boundary lines being displaced from the individual stroke and extending parallel to the individual stroke, each boundary pixel in one boundary line having a corresponding pixel in the other boundary line;

monitoring the status of the boundary pixels to determine the presence and location of stroke pixels from strokes outside of the individual stroke to be extracted indicating the presence of node regions within the individual stroke, and background pixels from non-stroke areas outside of the individual stroke to be extracted indicating the presence of body regions within the individual stroke;

causing the computer to cue body regions of the individual stroke to be extracted from the bit map of the stroke based symbol by deleting pixels forming the body regions; and protecting the node regions of the individual stroke to be extracted from cutting by not deleting node pixels.

2. The stroke extraction method of claim 1, wherein the individual stroke to be extracted from the stroke based symbol is a non-standard stroke which is extracted to enhance the pixel bit map of the stroke based symbol.

3. The stroke extraction method of claim 1, wherein, after the defining detection boundary line step but before the monitoring step, said method further comprises the step of:

merging the status of each boundary pixel in the series of boundary pixels of one straight boundary line with the corresponding boundary pixel in the series of boundary pixels of the other straight boundary line, resulting in a single series of composite status entries indicating the presence and location of node regions within the individual stroke to be extracted from the stroke based symbol.

4. The stroke extraction method of claim 3, wherein the merging step is an OR merge in which, if either one or both of the merged pixels has stroke status, then the resulting entry in the series of composite status entries also has stroke status.

5. The stroke extraction method of claim 3, wherein the merging step is a SUM merge in which the stroke status of each boundary pixel in one boundary line is added to the stroke status of the corresponding pixel in the other boundary line, and the resulting composite entry has stroke status if the merged sum is greater than a predetermined threshold status and has background status if the merged sum is less than the predetermined threshold status.

6. The stroke extraction method of claim 1, wherein the pixel distance "D" between the pair of straight boundary lines is uniform.

7. The stroke extraction method of claim 6, wherein the distance "D" excludes the edge boundary pixels in the boundary lines and is:

D= SW+ 2Np where

SW is the overall stroke width of all of the strokes forming the stroke based symbol, and Np is a predetermined number of pixels.

8. The stroke extraction method of claim 7, wherein Np= 2.

9. The stroke extraction method of claim 1, wherein, after the selecting step but before the defining detection boundary lines step, said method further comprises the step of:

rotating the stroke based symbol with the X–Y coordinate system of the pixel bit map to accommodate the pair of straight boundary lines which are parallel to one coordinate axis and normal to the other coordinate axis.

10. The stroke extraction method of claim 1, wherein, after the detection step but before the cutting step, said method further comprises the step of:

defining a rectangular cutting matrix for each body region of the individual stroke to be extracted which includes the body pixels and excludes the node pixels, and which is bounded on two opposed sides by the portions of the boundary lines having stroke status pixels.

11. The stroke extraction method of claim 1, wherein the pixel thickness of the straight boundary lines is one pixel.

12. The stroke extraction method of claim 1, wherein the pixel thickness of the straight boundary lines is two pixels.

13. The stroke extraction method of claim 1, wherein each of the straight boundary lines is formed by a series of contiguous pixels.

14. The stroke extraction method of claim 1, wherein each of the straight boundary lines is formed by a series of separated pixels with a section of non-monitored spacing pixels therebetween.

15. The stroke extraction method of claim 14, wherein the section of spacing pixels is less than one half of the stroke width of the stroke based symbol.

16. Apparatus for detecting node regions in a current stroke which are common to two or more strokes, and for cutting inter-node body regions from the current stroke which are unique to a single stroke, in a set of strokes forming a stroke based symbol stored in a pixel bit mar of stroke pixels having a stroke status value and background pixels having a background status value, said apparatus comprising:

a boundary generator response to the current stroke for generating a pair of node detection boundary lines formed by boundary pixels, one boundary line on each side of the current stroke the pair of boundary lines separated by a pixel distance "D" and extending parallel to the current stroke;

a pixel address circuit responsive to the boundary generator for addressing the pixel bit map to access the boundary pixels and retrieve the status values thereof; and a cutting circuit responsive to the status values of the boundary pixels for deleting the stroke pixels forming the body regions in the current stroke and for preserving the node pixels forming the common node regions in the current stroke;

wherein the coordinate system of the pixel bit map has a primary coordinate axis and a secondary coordinate axis, and the current stroke extends at a stroke angle "SA" with respect to the primary coordinate axis and at an angle "SA" plus 90 degrees with respect to the secondary coordinate axis; and the end pixels of the boundary lines are offset from the end pixels of the current stroke by the distance (D/2)sin(SA) along the primary coordinate axis and by the distance (D/2)cos(SA) along the secondary coordinate axis.

17. The apparatus of claim 16, wherein the primary axis is the vertical Y axis and the secondary axis is the horizontal X axis.

18. The apparatus of claim 16, wherein the primary axis is the horizontal X axis and the secondary axis is the vertical Y axis.

19. Apparatus for detecting node regions in a current stroke which are common to two or more strokes, and for cutting inter-node body regions from the current stroke which are unique to a single stroke, in a set of strokes forming a stroke based symbol stored in a pixel bit mad of stroke pixels having a stroke status value and background pixels having a background status value, said apparatus comprising:

a boundary generator response to the current stroke for generating a pair of node detection boundary lines formed by boundary pixels, one boundary line on each side of the current stroke, the pair of boundary lines separated by a pixel distance "D" and extending parallel to the current stroke;

a pixel address circuit responsive to the boundary generator for addressing the pixel bit map to access the boundary pixels and retrieve the status values thereof; and a cutting circuit responsive to the status values of the boundary pixels for deleting the stroke pixels forming the body regions in the current stroke and for preserving the node pixels forming the common node regions in the current stroke;

wherein the coordinate system of the pixel bit mad has a primary coordinate axis and a secondary coordinate axis, and the current stroke extends at a stroke angle "SA" with respect to the primary coordinate axis and at an angle "SA" plus 90 degrees with respect to the secondary coordinate axis;

said apparatus further comprising:

a rotational circuit for rotating the stroke based symbol relative to the coordinate system of the pixel bit map until the stroke angle of the current stroke is zero, and the current stroke and the boundary lines are parallel to the primary coordinate axis and normal to the secondary coordinate axis, and the primary offset is zero and the secondary offset is the distance "D".

\* \* \* \* \*